Jan. 7, 1969  C. G. MILBOURNE ET AL  3,420,641

MANUFACTURE OF COMBUSTIBLE GAS

Filed April 29, 1966 Sheet 1 of 3

Inventors:
Charles Gordon Milbourne
John T. Pinkston, Jr.
by Howson & Howson Attys

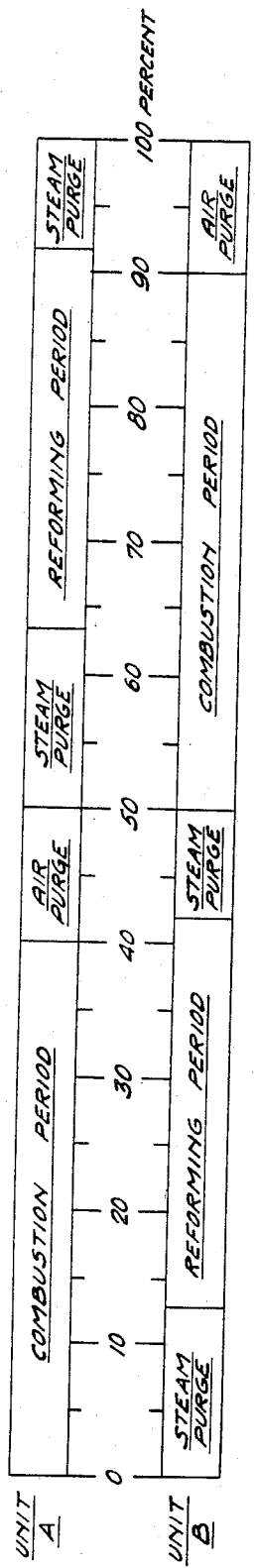

United States Patent Office 3,420,641
Patented Jan. 7, 1969

3,420,641
MANUFACTURE OF COMBUSTIBLE GAS
Charles Gordon Milbourne, Lansdowne, and John T. Pinkston, Jr., Swarthmore, Pa., assignors to United Engineers and Constructors Inc., Philadelphia, Pa., a corporation of Delaware
Filed Apr. 29, 1966, Ser. No. 546,374
U.S. Cl. 48—213　　　　　　　　　　　　　　　　1 Claim
Int. Cl. C01b 2/02

The present invention relates to a novel cyclic method for the manufacture of a gas, particularly useful as a utility gas, of intermediate to high (400–1000 B.t.u.) calorific value at superatmospheric pressure from hydrocarbons.

In our copending application Ser. No. 400,989, filed Oct. 2, 1964, and entitled "Manufacture of Gas Rich in Hydrogen," are disclosed and claimed a cyclic catalytic process for manufacturing gas at superatmospheric pressure involving the use of twin cyclic catalytic reforming units, operated under superatmospheric pressure, in association with a common gas expander (see also French Patent No. 1,386,057). The process of said copending application involves catalytic reaction between hydrocarbons and steam to provide a gas rich in hydrogen and oxides of carbon, mainly carbon monoxide, and the product gas is generally of low calorific value, the particular value depending upon the proportion of unconverted hydrocarbons therein.

It is the principal object of the present invention to provide a novel method for manufacturing combustible gas of intermediate to high calorific value.

It is another object of the present invention to provide a novel method for manufacturing combustible gas of intermediate to high calorific value utilizing cyclic principles and superatmospheric pressure conditions.

These and other objects will become apparent from a consideration of the following specification and claim.

The novel process of the present invention utilizes twin cyclic catalytic-thermal reforming gas units, operated under pressure, and in association with a common gas expander. The individual cycles of these two units are coordinated into one overall cycle wherein there is a continuous and substantially uniform flow of gases under pressure to a gas expander in which the gases under pressure are expanded to substantially atmospheric pressure. The energy derived from expanding the gases is utilized in turn to drive an air compressor which provides compressed air for use in the process.

The novel process, therefore, involves a cyclic process for the manufacture of a gas with a heating value in the range of 400 B.t.u. to 1000 B.t.u. per cubic foot which, in each cycle, comprises: (1) burning fluid fuel with compressed air in a first combustion zone, passing the resulting hot products of combustion, at an elevated pressure of at least 50 p.s.i.g., successively through a first heat storage zone of refractory material and then through a first zone of reforming catalyst to store heat in said first heat storage zone and said first catalyst zone and, substantially simultaneously, burning fluid fuel with compressed air in a second combustion zone downstream from said first catalyst zone, passing the resulting hot products of combustion along with the products of combustion from said first catalyst zone, at an elevated pressure of at least 50 p.s.i.g., through a second heat storage zone of refractory material, to store heat in said second heat storage zone, discontinuing said burning while continuing the flow of compressed air to purge combustion products from said first heat storage zone, said first catalyst zone and said second heat storage zone, expanding the products of combustion and air purge gases, from the elevated pressure to substantially atmospheric pressure, in an expanding zone, compressing air in a compressing zone with energy derived from this expansion in the expanding zone and passing the compressed air to said first and second combustion zones for said burning of fluid fuel and for said purging; and, while the aforesaid step (1) is being conducted, (2) passing steam, at an elevated pressure of at least 50 p.s.i.g., successively through a third heat storage zone of refractory material, a second zone of reforming catalyst and a fourth heat storage zone of refractory material to purge said third heat storage zone, said second catalyst zone and said fourth heat storage zone, then, while continuing the flow of steam, injecting hydrocarbons to be catalytically reformed, at said elevated pressure of at least 50 p.s.i.g., into said steam substantially between said third heat storage zone and said second catalyst zone and simultaneously injecting normally liquid hydrocarbons to be thermally reformed, at said elevated pressure of at least 50 p.s.i.g., substantially between said second catalyst zone and said fourth heat storage zone, said third heat storage zone, said second catalyst zone and said fourth heat storage zone containing heat stored therein according to step (3) below, the hydrocarbons injected between said third heat storage zone and said second catalyst zone being reformed in said second catalyst zone with said steam into a gas rich in hydrogen which then passes to said fourth heat storage zone where it mixes with said normally liquid hydrocarbons injected between said second catalyst zone and said fourth heat storage zone whereby said normally liquid hydrocarbons are thermally cracked in said fourth heat storage zone in the presence of said gas rich in hydrogen, and recovering the resulting product gas; and thereafter reversing said sequence by (3) burning fluid fuel with compressed air in a third combustion zone, passing the resulting hot products of combustion, at an elevated pressure of at least 50 p.s.i.g., successively through said third heat storage zone and through said second catalyst zone to store heat in said third heat storage zone and said second catalyst zone and, substantially simultaneously, burning a fluid fuel with compressed air in a fourth combustion zone downstream from said second catalyst zone, passing the resulting hot products of combustion along with the products of combustion from said second catalyst zone through said fourth heat storage zone to store heat therein, discontinuing said burning while continuing the flow of compressed air to purge combustion products from said third heat storage zone, said second catalyst zone and said fourth heat storage zone, expanding said products of combustion and air purge gases, from the elevated pressure to substantially atmospheric pressure, in said expanding zone, compressing air with energy derived from the expansion in the expanding zone, and passing the compressed air to said third and fourth combustion zones for said burning of fluid fuel and for said air purging, and while the aforesaid step (3) is being conducted, (4) passing steam at an elevated pressure of at least 50 p.s.i.g., successively through said first heat storage zone, said first catalyst zone and said second heat storage zone to purge said first heat storage zone, said first catalyst zone and said second heat storage zone, then, while continuing the flow of steam, injecting hydrocarbons to be catalytically reformed, at said elevated pressure of at least 50 p.s.i.g., into said steam substantially between said first heat storage zone and said first catalyst zone and simultaneously injecting normally liquid hydrocarbons to be thermally reformed, at said elevated pressure of at least 50 p.s.i.g., substantially between said first catalyst zone and said second heat storage zone, said first heat storage zone, said first catalyst zone and said second heat storage zone containing heat stored therein according to step (1) above, the hydrocarbons injected between said first heat storage zone and said first catalyst zone being reformed in said first catalyst zone with said steam into a gas rich in hydrogen which then passes to said second heat storage zone where it mixes with said normally liquid hydrocarbons injected between said first catalyst zone and said second heat storage zone whereby said normally liquid hydrocarbons are thermally cracked in said second heat storage zone in the presence of said gas rich in hydrogen, and recovering the resulting product gas; each of the combustion air-purging steps (1) and (3) making up one-half of the cycle time and the flow of gases to be expanded to the expanding zone being continuous and substantially uniform in mass throughout the cycle.

The process will be more readily understood from a consideration of the drawings in which:

FIG. 5 is a bar chart illustrating the timing sequence of a specific typical cycle.

Figure 1:
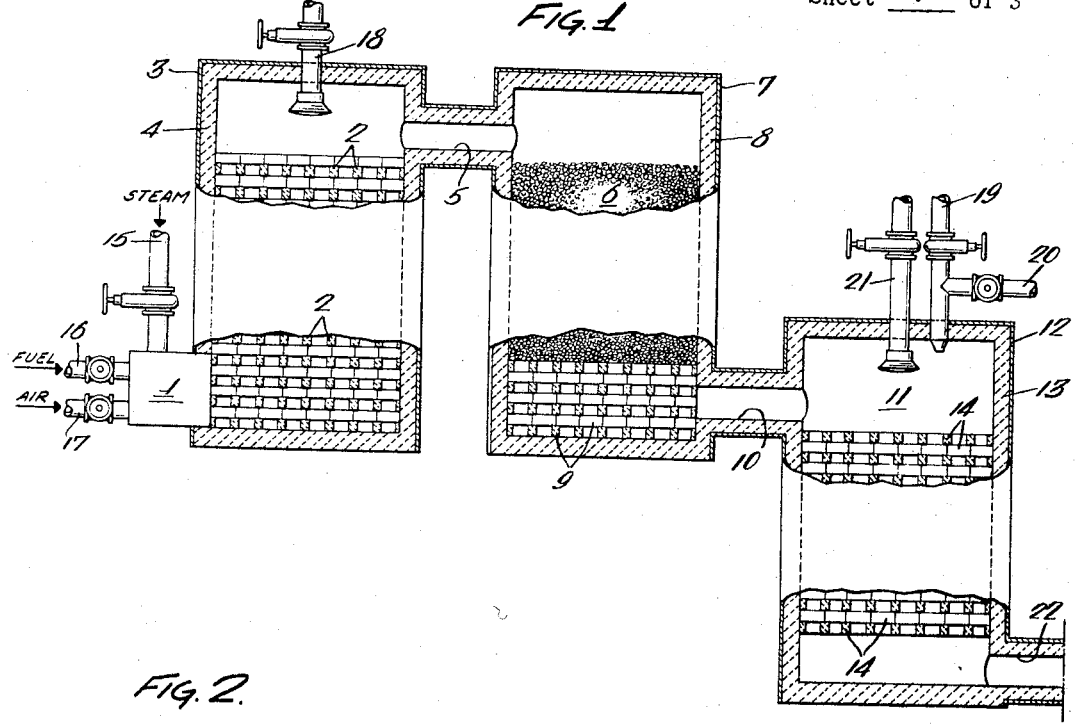
FIG. 1 is a side elevation view, partly in section, of a portion of typical apparatus making up each of the two substantially identical gas-making units.

Referring to FIG. 1, the combustion zone, which may be a refractory-lined box or tunnel, is represented by numeral 1. Numeral 2 represents the heat storage zone of noncatalytic refractory material, and 6 represents the reforming catalyst zone. Heat storage zone 2, may be contained in a steel shell 3 lined with refractory material 4. Heat storage zone 2 may be composed of checkerwork, and while this may be constructed of conventional checkerbrick, preferred checkerbrick for use is that forming the subject matter of U.S. Patent 3,037,758. Catalyst zone 6 may also be contained in a steel shell 7 lined with refractory material 8. Catalyst zone 6 is a relatively massive stationary bed of catalyst-containing bodies, described in detail hereinafter, and may be supported as on checkerwork structure 9. The top of catalyst zone 6 is connected with the exit end of heat storage zone 2 by means of refractory lined gasway 5. The bottom of catalyst zone 6 is connected with the inlet of second combustion zone 11 by means of refractory lined gasway 10. Second combustion zone 11 may be contained in the top of a steel shell 12 lined with refractory material 13. Heat storage zone 14 may also be contained in steel shell 12 under second combustion zone 11. Heat storage zone 14 is composed of checkerbrick or other suitable forms of noncatalytic refractory material, as described above in connection with heat storage zone 2. Connected to combustion zone 1 are valved conduits 15, 16 and 17 for introducing steam, fuel and air, respectively. Although not shown in the drawing, a portion of the steam may bypass combustion zone 1 and be fed directly into the entrance portion (bottom as shown in the drawing) of heat storage zone 2. Process hydrocarbons for catalytic reformation are admitted substantially between the exit portion of refractory zone 2 and the entrance portion of catalyst zone 6, as by valved conduit 18. As shown in the drawing, it is desirable that the process hydrocarbons to be catalytically reformed be injected into the steam stream, to insure thorough mixing of the process hydrocarbons and steam. Gases leaving the catalyst zone 6 pass through conduit 10 to the second combustion zone 11. Process hydrocarbons for thermal reformation are admitted substantially between the exit portion of catalyst zone 6 and the entrance portion of the second heat storage zone 14. As shown in the drawing, it is desirable that the process hydrocarbons to be thermally reformed be injected in such a manner as to insure thorough mixing of the process hydrocarbons to be thermally reformed and the hot gas rich in hydrogen coming from the catalyst zone 6. Connected to combustion zone 11 are valved conduits 19, 20 and 21 for introducing fuel, air and process hydrocarbons, respectively. Gases and hydrocarbon vapors pass through the refractory material in heat storage zone 14. The hydrocarbons admitted through valved conduit 21 become thermally cracked in heat storage zone 14 in the presence of the gas rich in hydrogen. This hydrogen reacts with hydrocarbon fragments resulting from initial thermal cracking and causes more of the hydrocarbon feedstock admitted through conduit 21 to be converted into permanent gases. Gases leaving heat storage zone 14 pass through conduit 22 for further handling in accordance with the present invention.

Figure 2:
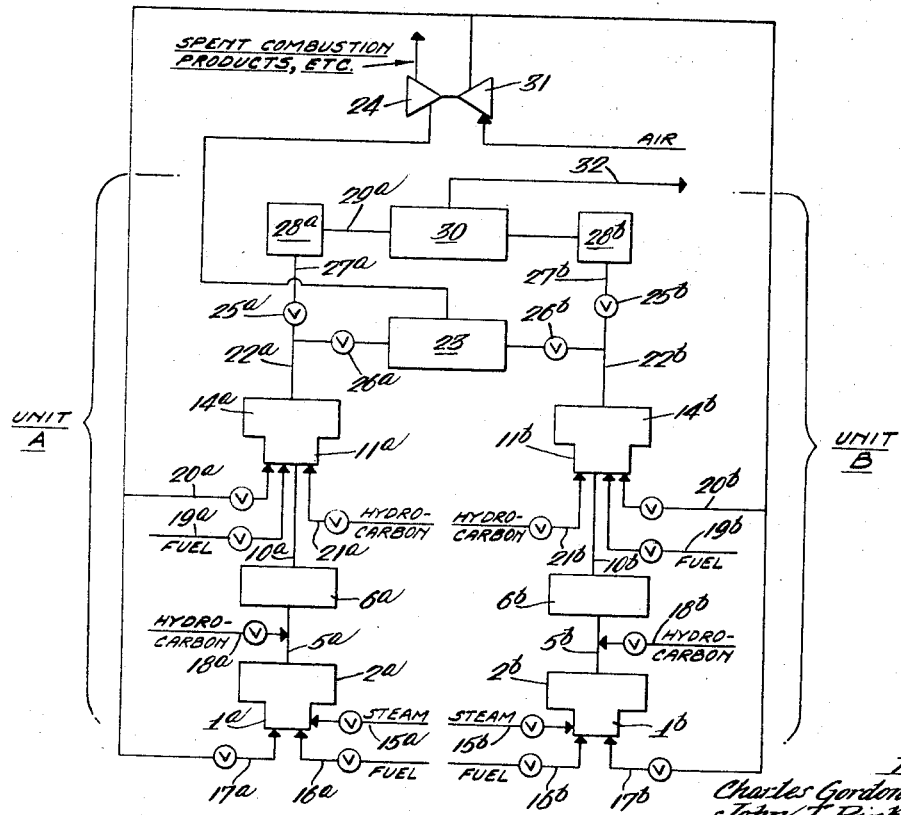
FIG. 2 is a diagrammatical plan view of the overall apparatus made up of the two units showing schematically the relationship of the various elements to each other.

In FIG. 2 is a diagram showing substantially the plan of the two units, labeled unit A and unit B, respectively, in association with common expander 24. Unit A consists of first combustion zone 1a, first heat storage zone 2a, gas passageway 5a, catalyst zone 6a, conduit 10a, second combustion zone 11a, second heat storage zone 14a and conduit 22a together with valved conduits 15a, 16a, 17a, 18a, 19a, 20a and 21a, respectively, for admitting steam, primary fuel, primary air, catalytic process hydrocarbons, secondary fuel, secondary air and thermal process hydrocarbons, respectively. These elements may be described in connection with FIG. 1. Likewise, unit B comprises first combustion zone 1b, first heat storage zone 2b, gas passageway 5b, catalyst zone 6b, conduit 10b, second combustion zone 11b, second heat storage zone 14b, and conduit 22b together with valved conduits 15b, 16b, 17b, 18b, 19b, 20b, and 21b, respectively, for the introduction of steam, primary fuel, primary air, catalytic process hydrocarbons, secondary fuel, secondary air and thermal process hydrocarbons, respectively. Likewise these elements may be as described in FIG. 1. In addition, as also shown in FIG. 2, units A and B may be provided with waste heat boilers 23 and 30. These may serve as a source for steam used during the process.

As shown in FIG. 2, there is a common gas expander 24. Combustion products and purge gases (air and/or steam) coming from unit A, when that unit is undergoing its heating half of the cycle, may be diverted through the waste heat boiler 23 into gas expander 24 by closing valves 25a and 26b and opening valve 26a. Likewise, combustion products and purge gases (air and/or steam) coming from unit B when that unit is undergoing its heating half of the cycle, may be passed into gas expander 24 by closing valves 25b and 26a and opening valve 26b. On the other hand, product gases and purge gases (air and/or steam) coming from unit A when that unit is undergoing its reforming half of the cycle, may be passed to conduit 27a by closing valve 26a and opening valve 25a. The hot (about 1500° F.) gases from conduit 27a are passed to the cooler tower 28a and partially cooled to about 800° F., by an oil or water spray. The mixture of partially cooled gases and the vaporized portion of the cooling oil or water may be passed to a waste heat boiler 30 and then to conduit 32. Likewise, product gases and purge gases (air and/or steam) coming from unit B, when that unit is undergoing its reforming half of the cycle, may be passed through conduit 27b, to cooler tower 28b and waste heat boiler 30 by closing valve 26b and opening valve 25b.

In passing through gas expander 24, the gases which arrive under a superatmospheric pressure of at least 50 p.s.i.g., expand to substantially atmospheric pressure, releasing energy which in turn is utilized to perform work. This energy is utilized to drive air compressor 31. In air compressor 31 air is compressed for utilization during the process, principally to support combustion during the heating portions of the cycle, and also to serve as a purging medium.

By the present invention, in spite of the various operations, steps and reactions taking place, there is uninterrupted, continuous and substantially uniform mass flow of gases under pressure to gas expander 24, so that, although cyclic operation is utilized respectively in units A and B, gas expander 24 operates in a continuous and substantially uniform manner.

Figure 3:
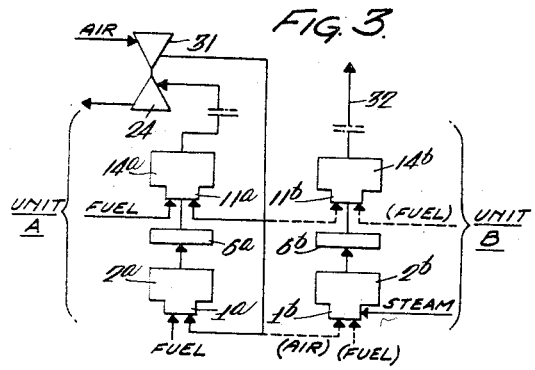
FIGS. 3–3C and 4–4C are flow diagrams illustrating schematically the principal sequence of steps conducted during the entire cycle.
Figure 4:
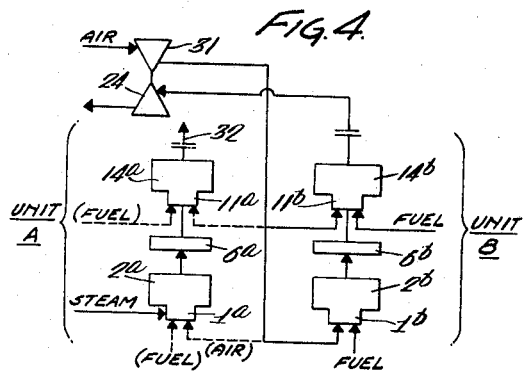
Figure 3A:
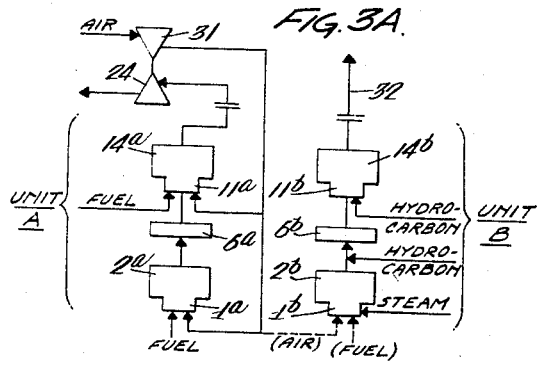
Figure 4A:
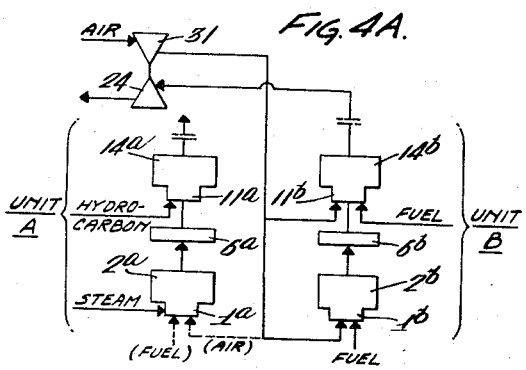
Figure 3B:
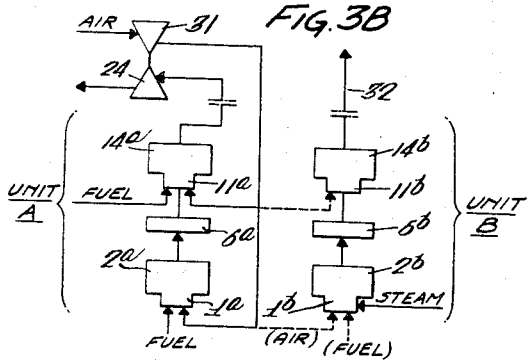
Figure 4B:
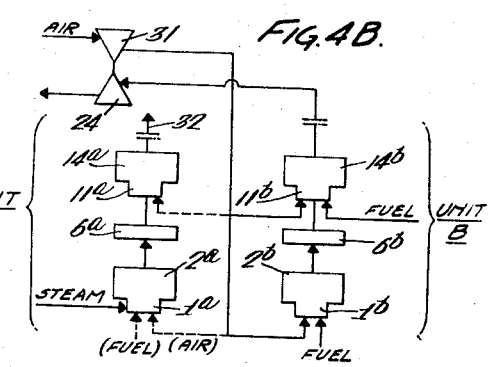
Figure 3C:
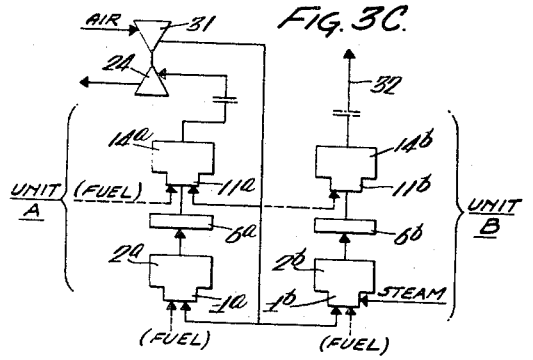
Figure 4C:
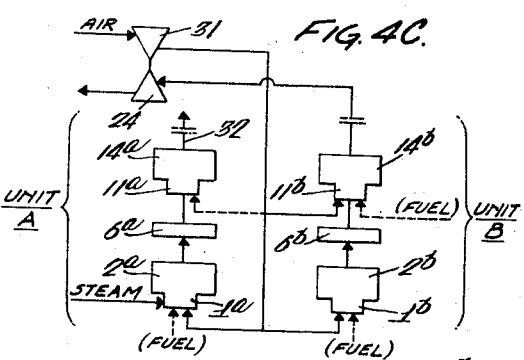

FIGS. 3–3C and 4–4C illustrate the sequence of the principal steps during one cycle according to the present invention. FIGS. 3–3C illustrate one-half of the cycle during which unit A is undergoing its heating portion (period) of the cycle and unit B is undergoing its reforming portion (period) of the cycle. FIGS. 4–4C illustrate the other half of the cycle during which unit A is undergoing its reforming portion of the cycle and unit B is undergoing its heating portion of the cycle.

In FIG. 3 compressed air from compressor 31 and fuel are admitted to combustion zone 1a and are burnt therein. The fuel becomes ignited in combustion zone 1a by residual heat stored therein or, if necessary, by conventional ignition means. The resulting hot products of combustion are then passed through refractory, heat storage zone 2a and through catalyst zone 6a. Simultaneously, compressed air from compressor 31 and fuel are admitted to combustion zone 11a and are burnt therein and mixed with the hot combustion products from catalyst zone 6a. The fuel becomes ignited in combustion zone 11a by residual heat stored therein or, if necessary, by conventional ignition means. The resulting mixture of hot products of combustion is then passed through the refractory, heat storage zone 14a. This combustion and the resulting hot products of combustion store heat in combustion zone 1a, heat storage zone 2a, catalyst zone 6a, combustion zone 11a and heat storage zone 14a, as well as in the refractory linings of the shells containing them. A great amount of heat may be stored in this manner and the refractory materials, including the catalyst, serve as a heat "sink." The hot products of combustion, under pressure, are then passed to gas expander 24 (as by way of waste heat boiler not shown). The waste heat boiler is preferred for most efficient operation and should permit quick control, as by appropriate partial by-passing, of the temperature of the gases going to the expander. In expanding from their high superatmospheric pressure to substantially atmospheric, the combustion gases activate expander 24, which in turn drives air compressor 31. The gases leaving expander 24 are essentially at atmospheric pressure and may be vented to the atmosphere. While the foregoing is going on in unit A, unit B will be beginning its gas-making or reforming portion of the cycle. Initially steam is admitted to combustion zone 1b and preferably also separately to the base of heat storage zone 2b, passing thence through catalyst zone 6b, combustion zone 11b and heat storage zone 14b. This purge serves to clear unit B of combustion products and air from its preceding heating period of the cycle, and to prevent excessive temperatures in the refractory lining of combustion zone 1b, in the inlet of heat storage zone 2b, in the refractory lining of combustion zone 11b and in the inlet of heat storage zone 14b. This is followed by the sequence shown in FIG. 3a. Combustion continues in unit A, and in unit B, while the flow of steam is continued, the process hydrocarbons to be reformed catalytically are admitted to the steam stream substantially between heat storage zone 2b and catalyst zone 6b. The steam passing through heat storage zone 2b becomes highly heated, so that by the time the hydrocarbons are injected thereinto it contains much sensible heat which it imparts to the hydrocarbons upon becoming intimately mixed therewith. In passing through catalyst zone 6b, the mixture of hydrocarbons and steam reacts endothermically with the absorption of heat to form a gas consisting largely of hydrogen and oxides of carbon, mainly carbon monoxide. Simultaneously, hydrocarbons are injected substantially between catalyst zone 6b and heat storage zone 14b, as into combustion zone 11b, and mixed with the high hydrogen gas from the catalyst zone 6b. The mixture passes through heat storage zone 14b where the hydrocarbons are thermally reformed, in the presence of gas rich in hydrogen, to substantially fixed gases and to minor degree to heavy hydrocarbons (tar). When the reforming in unit B is completed, the introduction of hydrocarbons is discontinued but the flow of steam is continued, as shown in FIG. 3B, to purge product gas from unit B. In the meantime, as also shown in FIG. 3B, combustion continues in unit A. The steam purge in unit B is of brief duration, and the sequence then goes to that shown in FIG. 3C wherein the introduction of fuel to combustion zone 1a of unit A is discontinued while the flow of air is continued to purge combustion products from the unit. At this time some air may be passed to unit B, as shown in FIG. 3C.

Throughout the entire series of steps shown in FIGS. 3–3C, combustion products under pressure and purge gases under pressure (air and/or steam) from unit A are fed continuously in an uninterrupted manner and at a substantially constant and uniform mass rate to gas expander 24. The series of steps basically shown in FIGS. 3–3C will take up 50% of the entire cycle.

The second half of the cycle is one in which unit A which has just previously been heated as shown in the sequence from FIGS. 3–3C, is utilized for reforming, and unit B, which has just previously been utilized for reforming, becomes heated. The sequence of steps shown in FIGS. 4–4C is the same as shown in and as described above in connection with FIGS. 3–3C except the units are reversed. Likewise, the series of steps basically shown in FIGS. 4–4C make up the remaining 50% of the cycle.

By coordinating the reforming period, including associated purges, taking place in one unit with the heating period, including associated purges, taking place in the other, as shown above, a continuous flow of combustion gases and purge gases (and/or steam) is provided to the gas turbine, and a continuous flow of compressed air is obtained from the compressor.

It will also be noted that, following the principal combustion steps in each cycle, that is following FIG. 3B and FIG. 4B, the flow of air is continued, preferably at an undiminished rate, into combustion zones 1a and 1b, and may be at a diminished rate into combustion zones 11a and 11b, respectively. This free air is heated in the combustion zones and in the refractory, heat storage zones and burns off carbon and sulfur which may have been deposited in the respective catalyst zones and burns off carbon which may have been deposited in the heat storage zones 14a and 14b during the prior reforming portions of the cycle therein. In addition, and most importantly, the passage of air in the manner through the catalyst zones helps to control the heat distribution in the catalyst zone through oxidation of the nickel or cobalt catalyst metal, which oxidized catalyst metal subsequently becomes reduced in the cycle through corresponding oxidation (combustion) of oxidizable gas (the hydrocarbon being reformed or reformed products thereof). This combination metal-oxidation, metal-reduction and gas-oxidizing sequence is the subject matter of United States Patent 2,759,805, the disclosure of which is incorporated herein by reference.

As will be obvious to those skilled in the art, the timing of the opening and closing of the valves controlling the flow of gases either to the gas expander 24 or to gas recovery equipment through conduit 32, in conjunction with the corresponding opening and closing of valves upstream, will be governed by the normal time lags occurring in flowing from the upstream end of each unit to the downstream end thereof. Thus, there may be a time interval between the commencement of the admission of fuel for combustion and the diversion of the exit gas, downstream, from the product gas recovery system to the turbine. Hence, it will be realized that a step beginning in one unit need not commence precisely at the same time as another step commences in the other unit, as may be depicted in FIGS. 3–3C and 4–4C. The essential requirements are that the heat stored in each unit per cycle be equivalent to the heat withdrawn from that unit each cycle; that the temperature be controlled to insure the most efficient reaction conditions consistent with the particular hydrocarbon reactant employed and the particular gas product being produced, and that the flow of gas through the gas expander be uninterrupted and continuous and at a substantially uniform mass rate, not only during the entire cycle but from cycle to cycle. This latter requirement can readily be achieved through controlled admission of steam to the system during periods when the flow of combustion products is diminished. In this connection, although not shown in FIGS. 3–3C and 4–4C, auxiliary steam for this purpose may be provided to the gas expander directly from waste heat boilers 23 and 30, respectively, shown in FIG. 2. In addition, while the drawings show the combustion zone, heat storage zones and catalyst zone to be in separate shells, it will be apparent that, in each unit, these may be contained in a large single shell provided with space and means, such as a bosh, between zones to insure intimate mixing of the hydrocarbon with the steam and intimate mixing of the hydrocarbon with the high hydrogen gas. Moreover, while FIG. 1 shows gas flowing upwardly through first heat storage zone 2 and downwardly through catalyst zone 6 and heat storage zone 14, this is not essential and gas flow could be downward through heat storage zone 2 and upward through catalyst zone 6 and heat storage zone 14. Downward flow through catalyst zone 6 and heat storage zone 14 may have the advantage of minimizing agitation of the catalyst bodies in catalyst zone 6 and refractory bodies in heat storage zone 14. Although the gas expander is illustrated as being of the turbo type, it will be understood that other types, including reciprocating types, may be used. Similarly, although the air compressor is illustrated as being of the centrifugal or axial flow type, other types may be used.

For optimum gas-making capacity, each complete cycle will be of short duration, usually not more than about 5 minutes nor less than 2 minutes, with the presently preferred cycle being about 3 to 4 minutes in duration. Where maximum capacity is not the prime consideration, the cycle may last as long as 6 minutes. Generally, at least about 60% of the cycle time, preferably between about 60% and about 75%, is made up of the actual combustion and reforming portions of the cycle, the balance being the purges.

In a typical cycle having a duration of 4 minutes, each combustion period (depicted in FIGS. 3–3B for unit A and in FIGS. 4–4B for unit B) makes up about 40% of the cycle time. Each air purge following combustion (depicted in FIG. 3C for unit A and in FIG. 4C for unit B) make up about 10% of the cycle time. In this illustration, each reforming period (depicted in FIG. 3A for unit B and in FIG. 4A for unit A) makes up about 29% of the cycle time and each following steam purge (depicted in FIG. 3B and 3C for unit B and in FIG. 4B and 4C for unit A) make up about 8% of the cycle time. The steam purge preceding the reforming period or following the air purge (depicted in FIG. 4 for unit A and in FIG. 3 for unit B) makes up about 13% of the cycle. The foregoing is illustrated in FIG. 5 where the percentage of total cycle time devoted to a particular step in the respective units is set forth graphically for a typical representative cycle.

The present process, as stated, is conducted at superatmospheric pressure. Normally, pressures well above atmospheric (at least about 50 p.s.i.g.) will be employed. The maximum pressures employed may depend somewhat upon the characteristics desired in the product gas. In most cases, however, it will not be necessary to exceed about 250 p.s.i.g., and a pressure within the range of from 50 to about 225 p.s.i.g. will be found satisfactory for most purposes. Regardless of the pressure selected, such pressure conditions should be maintained substantially constant throughout the system and throughout the cycle.

The present process is both catalytic and thermal. It relies in part upon nickel or cobalt, preferably the former, to catalyze the reaction between the process hydrocarbons and steam in the catalytic reforming zone (catalyst zone 6). It also relies in part on non-catalytic, heat storage refractory material to thermally reform the process hydrocarbons in the presence of a high hydrogen gas in the thermal reforming zone (heat storage zone 14).

With respect to the catalyst, a suitable refractory carrier is employed, upon which the catalyst metal is disposed and throughout which it may be distributed. Difficultly reducible oxides, such as alumina, silica, magnesia, calcium oxide, titanium oxide, chromium oxide, oxides of rare earth metals such as, for example, thoria, ceria, and/or others may be present. Compounds, such as chromates and silicates, for instance zirconium silicate, may be employed. Catalytic bodies in which the catalyst metal is distributed upon refractory bodies having a porosity of between about 15% and about 60%, preferably between about 35% and about 45%, with a concentration of catalyst metal between about 2½ and about 25% are satisfactory. Preformed catalyst carrier bodies may be impregnated with a solution of a salt of the catalyst metal or with molten salt of the catalyst metal, followed by calcining, or a paste of carrier material may be made using a solution of a salt of the catalyst metal following which the paste is formed into the desired shape and calcined. Alumina is preferred as a carrier for the catalyst metal.

One specific catalyst that might be employed is composed of alumina bodies in which the outer periphery of each body, at least to a depth of about $\frac{1}{32}$–$\frac{1}{16}$ of an inch, consists essentially of particles at least the surface of which consists of a spinel (either nickel spinel or magnesium spinel) which spinel particles additionally have a film of nickel thereon. Such a catalyst is the subject matter of co-pending application Ser. No. 350,520, filed Mar. 9, 1964, by Charles Gordon Milbourne, now Patent No. 3,368,982.

The catalyst will be in the form of discrete bodies, such as spheres, cubes, cylinders, rings, lumps, and the like. Spheres are preferred. Catalyst bodies having an average diameter of from about ¼ to about 2 inches, or the equivalent, are suitable.

The process of the present invention involves, as stated, the use of a relatively massive, stationary zone of catalyst material. By "massive" is meant a relatively deep bed of catalyst material, for example, at least about 4 feet in depth and up to about 15 feet in depth. The diameter of the catalyst zone may vary greatly, from about ½ foot up to about 15 feet, with most catalyst zones ranging from about 1 to about 12 feet in diameter. By "stationary" is meant that the catalyst material remains at rest and that the position of each catalytic body is more or less fixed with respect to the others as distinguished from fluidized processes. A particularly preferred catalyst zone is that set forth in copending application Ser. No. 407,706, the disclosure of which is incorporated herein by reference.

The hydrocarbon material reformed in the catalytic reforming zone may be normally gaseous hydrocarbons such as, for example, methane, ethane, propane or butane, or substantially ash-free hydrocarbon distillates, like kerosene, gasoline, diesel oil and gas oil. By "substantially ash-free" is meant containing less than about 100 parts of ash per million. Corresponding unsaturated hydrocarbons may be present, such as, for example, ethylene, propylene butylene, and the like. When normally liquid hydrocarbons are employed, they may be converted to the gaseous state prior to or upon introduction to the steam stream. Natural gas, which is primarily methane, and refinery gas streams are among the hydrocarbon materials that may be employed. The hydrocarbon material reformed in the thermal reforming zone will be hydrocarbons that are normally liquid at atmospheric pressure. Such hydrocarbons include those above butane, such as naphtha, kerosene, gasoline, diesel oil, crude oil, and the like.

With respect to the fuel employed during the heat storage portions of the cycle, it may be, in the combustion preceding the catalyst zone, any substantially ash-free fluid combustible such as the normally gaseous hydrocarbons and ash-free hydrocarbon distillates referred to above, and, in the combustion just preceding the thermal reforming zone (in combustion zone 11) it may be any fluid combustible, such as those mentioned above, although in this case the fuel need not be substantially ash-free. The term "fluid" means normally gaseous or normally liquid. Where a liquid fuel is employed, conventional spraying or other vaporizing means may be utilized to facilitate combustion.

The preferred amount of steam in the catalytic reforming zone is between about 1.5 and about 2.5 pounds mols per pound atom of carbon in the hydrocarbon reactant used in this zone during the reforming portion of the cycle, although in some instances the amount of steam may go up to about 5 pound mols.

The temperatures provided in the system are, of course, subject to swing, as between the end and beginning of the heating period in each unit, and to gradient, as between different locations in each unit at the same time. Likewise, as is known to those skilled in the art, the exact temperatures employed may be determined in part by the type of product gas desired and the process hydrocarbons employed. In general, the temperature of the steam leaving each heat storage zone upstream of the catalyst zone (heat storage zone 2) during the reforming portion of the cycle will be in the range of from about 1500° F., to about 2200° F., so that the resulting mixture of hydrocarbons and steam entering the catalyst zone will have a temperature in the range of from about 1300° F. to about 1750° F. The temperature in the catalyst zone itself will normally not go below 1300° F. The upper limit of the temperature may also depend, in part, upon the nature of the catalyst, and some catalysts may stand temperatures as high as about 2000° F. In general, the preferred average temperatures in the catalyst zone during the cycle will be between about 1400° F., and about 1600° F. The catalytically reformed gas leaving the catalyst zone and entering the heat storage zone 14 during the reforming portion of the cycle will normally be at a temperature between about 1250° F., and about 1600° F. The temperature in the thermal reforming heat storage zone 14 itself will normally not go below 1300° F. The upper limit of temperature in this zone may depend, in part, upon the type of product gas desired and the process hydrocarbon used in this zone. In general, the preferred average temperatures in heat storage zone 14 during the cycle will be between about 1300° F., and about 1800° F. The product gas leaving the thermal reforming heat storage zone 14 will normally be between about 1400° F., and about 1600° F.

The product gas will be rich in hydrocarbons having 1 to 4 carbon atoms. The gas may range from a calorific value of about 400 B.t.u. per cubic foot, up to a gas having a calorific value of about 1000 B.t.u. per cubic foot. The calorific value is varied in part by varying the ratio of the amount of process hydrocarbon used in the catalytic reforming zone and the amount of process hydrocarbon used in the thermal reforming zone. A particular calorific value desired is maintained constant by maintaining the ratio of process hydrocarbon to the two zones substantially constant.

In the following illustrative examples apparatus similar to that shown in the drawings is used. The data are based on the use of catalyst zones 6½′ I.D. and 10′ in depth; the catalyst being in the form of alumina spheres ranging from ½″ to 1½″ in diameter and containing 5% of nickel, and thermal reforming zones 6½′ I.D. and an overall height of 17′ of which the middle 11′ is 2¼″ diameter silicon carbide spheres.

EXAMPLE 1

This example sets forth data on materials and conditions for producing 572 B.t.u. gas at 150 p.s.i.g. from Arabian crude oil. The crude oil is subjected to distillation, the lightest cut (up to about 300° F.) serving as process hydrocarbon for catalytic reforming, the middle cut (about 300–450° F.) being primarily kerosene used for scrubbing light oil at 10 atm. from the product gas and this mixture of kerosene and light oil serving as fuel for the catalytic reforming section, and the heaviest cut (above about 450° F.) serving as process hydrocarbon for thermal reforming. Tar is produced during the process and a portion of this is used as fuel for the thermal reforming section, and efficiency is calculated with and without taking the tar produced into consideration (tar credit).

(A) Production data:

| Type Gas | Set gas | Gas scrubbed at 10 atm. |
|---|---|---|
| Production per day: | | |
| M.c.f. | 14,560 | 14,400 |
| B.t.u. per c.f. | 600 | 572 |
| Specific gravity | 0.61 | 0.61 |
| Materials required—gallons per m.c.f.: | | |
| Kerosene fraction and light oil for heating (catalytic section) | 0.82 | 0.82 |
| Tar for heating (thermal section) | 0.18 | 0.18 |
| Light crude fraction for process (catalytic section) | 3.08 | 3.11 |
| Heavy crude fraction for process (thermal section) | 2.39 | 2.42 |
| Total crude oil [1] | 6.00 | 6.07 |
| Steam total, purge+process (#/m.c.f.) | 66 | 67 |
| Overall Efficiency, percent: | | |
| Without tar credit | [2] 72.5 | 71.5 |
| With tar credit at B.t.u. value | 81.5 | 80.8 |

[1] Includes kerosene fraction of crude oil used for scrubbing.
[2] Corrected for light oil recovered from gas and used as fuel.

(B) Typical operating data (for each unit of the two-unit set):

| Cycle 3 minutes | Percent | G.p.m. | Catalytic section—Fuel or process hydrocarbon | | G.p.m. | Thermal section—Fuel or process hydrocarbon | |
|---|---|---|---|---|---|---|---|
| | | | Air, c.f.m. | Steam, l.b.m. | | Air, c.f.m. | Steam, l.b.m. |
| Combustion period | [1] 42 | 10.0 | 17,500 | | 2.2 | 4,500 | |
| Air purge | 8 | | 17,500 | | | 4,500 | |
| Steam purge | 13 | | | 630 | | | 40 |
| Reforming period | 27 | 57.0 | | 630 | 44.5 | | 40 |
| Steam purge | 10 | | | 630 | | | 40 |

[1] The first 5% serves as purge.

(C) Turbocompressor data:

Capacity, c.f.m. _____ 22,000
Discharge pressure, p.s.i.g. _____ 180

(D) Miscellaneous data:

Set gas—

Grains/100 c.f.
$H_2S$ _____ 170
Organic sulfur _____ _____
$C_{10}H_8$ _____ 4

(E) Feedstock analysis:

| | Arabian crude oil |
|---|---|
| A.P.I. | 35 |
| Specific gravity | 0.85 |
| Distillation, °F.: | |
| 0–300 _____percent__ | 30.6 |
| 300–450 _____do____ | 27.2 |
| 450–650 _____do____ | 19.5 |
| Over 650 _____do____ | 22.7 |
| Sulfur, wt. percent_____ | 1.66 |
| Carbon residue, wt. percent_____ | 6.8 |
| Calorific value, B.t.u./gal_____ | 132,000 |

(F) Product gas analysis:

| | Set gas unscrubbed | Set gas scrubbed at 10 atm. |
|---|---|---|
| B.t.u. per c.f. | 600 | 572 |
| Specific gravity | 0.61 | 0.61 |
| Volume percent: | | |
| $CH_4$ | 20.5 | 20.7 |
| $C_2H_6$ | 4.6 | 4.7 |
| $C_3H_8$ | 0.2 | 0.2 |
| $C_2H_4$ | 5.6 | 5.7 |
| $C_3H_6$ | 1.3 | 0.7 |
| $C_4H_8$ | 0.2 | 0.0 |
| $C_4H_6$ | 0.1 | 0.0 |
| $C_6H_6$ | 0.3 | 0.0 |
| $CO_2$ | 7.3 | 7.4 |
| CO | 13.2 | 13.4 |
| $O_2$ | 0.2 | 0.2 |
| $H_2$ | 36.5 | 36.9 |
| $N_2$ | 10.0 | 10.1 |

EXAMPLE 2

This example sets forth data on materials and conditions for producing 830 B.t.u. gas at 150 p.s.i.g. from diesel oil. Diesel oil is used as fuel in the thermal section and as process hydrocarbon for catalytic reforming and for thermal reforming. In addition diesel fuel is employed for scrubbing light oil from the product gas and this mixture of diesel oil and light oil is used as fuel for the catalytic reforming section. The following data are based on the use of catalyst zones 8′ I.D. and 10′ in depth, the catalyst being in the form of alumina spheres ranging from ½″ to 1½″ in diameter and containing 5% of nickel, and thermal reforming zones 10′ I.D. and an overall height of 16′ of which the middle 10′ is 2¼″ silicon carbide spheres.

(A) Production data:

| | |
|---|---|
| Calorific value, B.t.u./c.f. _____ | 838 |
| Capacity, m.c.f./day _____ | 20,000 |
| Feedstock required per m.c.f.—gallons— | |
| For catalytic section process _____ | 2.14 |
| For catalytic section heating [1] _____ | 0.47 |
| Thermal section process _____ | 6.14 |
| Thermal section heating [1] _____ | 0.47 |
| Total _____ | 9.22 |
| Overall thermal efficiency, percent (no tar credit) _____ | 67.3 |
| Overall thermal efficiency, percent (with tar credit) _____ | 78.6 |
| Tar and light oil per m.c.f., gallons _____ | 0.94 |
| Process and purge steam required, lbs./m.c.f. _____ | 52 |
| Steam produced by waste heat boilers, lbs./m.c.f. _____ | 52 |

[1] Does not include 0.37 gal./m.c.f. of light oil scrubbed from make gas (equivalent to 50 B.t.u./c.f.).

Gas analysis, percent:

| | |
|---|---|
| Ill. _____ | 15.0 |
| CO _____ | 10.2 |
| $H_2$ _____ | 21.9 |
| $CH_4$ _____ | 40.1 |
| $C_2H_6$ _____ | --- |
| $CO_2$ _____ | 5.6 |
| $O_2$ _____ | 0.2 |
| $N_2$ _____ | 7.0 |
| Specific gravity _____ | 0.72 |
| $H_2S$, grains per 100 c.f. _____ | 15 |
| $C_{10}H_8$, grains per 100 c.f. (approx.) _____ | 4 |

(B) Typical operating cycle and rates:

CYCLE—4 MINUTES

| | Percent | |
|---|---|---|
| | Catalytic | Thermal |
| Section: | | |
| Blow_____ | 40 | 47 |
| Air purge_____ | 10 | 3 |
| Steam purge_____ | 13 | 13 |
| Reforming steam purge_____ | 0 | 2 |
| Reforming_____ | 27 | 27 |
| Steam purge_____ | 10 | 3 |
| Rates: | | |
| Fuel, g.p.m_____ | 11.4 | 10.8 |
| Process, g.p.m_____ | 53 | 159 |
| Combustion air, c.f.m_____ | 21,000 | 21,000 |
| Process steam, l.b.m_____ | 585 | 40 |
| Purge steam, l.b.m_____ | 770 | 40 |

Typical feedstock analysis:

| | |
|---|---|
| Carbon-hydrogen ratio _____ | 6.35 |
| Sulfur, weight percent _____ | 0.1 |
| Calorific value, B.t.u./gal. _____ | 135,000 |
| Specific gravity _____ | 0.83 |

EXAMPLE 3

This example sets forth a comparison of data obtained in a small scale unit on materials and conditions for producing an 848 B.t.u. gas by the present process and for producing a 906 B.t.u. gas by a straight thermal reforming process using naphtha as process hydrocarbons for both catalytic and thermal reforming and operating at 150 p.s.i.g. pressure. The present process recovers 89.8% of the calorific value of the process hydrocarbon in the form of permanent gases as compared to 78.3% in the straight thermal reforming process. Further, the present process recovers 100% of the hydrogen and 82.8% of the carbon in the process hydrocarbon as compared to 87.5% of the hydrogen and 65.2% of the carbon in the straight thermal reforming process.

| | Present process | Straight thermal process |
|---|---|---|
| Process eff., percent_____ | 89.8 | 78.3 |
| Make oil recovery, B.t.u./gal_____ | 108,000 | 92,400 |
| Process hydrocarbon, gal./m.c.f.: | | |
| Catalytic_____ | 2.00 | 0.0 |
| Thermal_____ | 6.01 | 9.82 |
| Total_____ | 8.01 | 9.82 |
| Process rates, gal./min.: | | |
| Catalytic_____ | 0.2 | 0.0 |
| Thermal_____ | 0.6 | 0.6 |
| Steam rates, lb./min_____ | 2.2 | 2.2 |
| Temperature ave. °F.: | | |
| Catalytic reformer_____ | 1,460 | |
| Thermal reformer_____ | 1,470 | 1,470 |
| Gas analyses, percent: | | |
| $C_2H_4$_____ | 9.1 | 10.1 |
| $C_3H_6$_____ | 2.5 | 2.5 |
| $C_4H_8$_____ | 0.6 | 0.5 |
| $C_4H_6$_____ | 0.3 | 0.4 |
| $C_5H_8$_____ | | 0.1 |
| $C_5H_6$_____ | 0.1 | 0.2 |
| $C_5H_{10}$_____ | 0.1 | 0.2 |
| $C_6H_{12}$_____ | 0.1 | 0.1 |
| $C_7H_{14}$_____ | | 0.1 |
| $C_6H_6$_____ | 0.1 | 0.1 |
| Total illuminants_____ | 12.9 | 14.3 |
| $CH_4$_____ | 37.5 | 45.1 |
| $C_2H_6$_____ | 6.7 | 4.9 |
| $C_3H_8$_____ | 0.3 | 0.3 |
| $C_4H_{10}$_____ | | 0.3 |
| Total paraffins_____ | 44.5 | 50.6 |
| CO_____ | 10.2 | 4.7 |
| $H_2$_____ | 21.3 | 12.4 |
| $CO_2$_____ | 8.3 | 2.2 |
| $N_2$_____ | 2.6 | 15.4 |
| $O_2$_____ | 0.2 | 0.4 |
| B.t.u._____ | 848 | 906 |
| S.G._____ | 0.72 | 0.77 |
| $H_2$ recovery, percent (corr. for cat. reduction)_____ | 100.0 | 87.5 |
| Carbon recovery, percent_____ | 82.8 | 65.2 |

Modification is possible in the particular procedural techniques and materials employed and in the amounts thereof without departing from the scope of the invention as set forth in the following claim.

What is claimed is:

1. The cyclic process for manufacturing a gas having a calorific value in the range of from about 400 B.t.u. per cubic foot to about 1000 B.t.u. per cubic foot which, in each cycle, comprises substantially simultaneously: (1) burning fluid fuel with compressed air in a first combustion zone, passing the resulting hot products of combustion, at an elevated pressure of at least 50 p.s.i.g., successively through a first heat storage zone of refractory material and then through a first zone of reforming catalyst to store heat in said first heat storage zone and said first catalyst zone, and, substantially simultaneously, burning fluid fuel with compressed air in a second combustion zone and passing the resulting hot products of combustion along with the products of combustion from said first catalyst zone, at an elevated pressure of at least 50 p.s.i.g., through a second heat storage zone of refractory material to store heat in said second heat storage zone, then discontinuing said burning while continuing the flow of compressed air to purge combustion products from said first heat storage zone, said first catalyst zone and said second heat storage zone, expanding said products of combustion and purge gases, from said elevated pressure to substantially atmospheric pressure, in an expanding zone, compressing air in a compressing zone with energy derived from such expansion in said expanding zone and passing said compressed air to said first combustion zone and said second combustion zone for burning said fluid fuel and for said purging, and (2) passing steam, at an elevated pressure of at least 50 p.s.i.g., successively through a third heat storage zone of refractory material, a second zone of reforming catalyst and a fourth heat storage zone of refractory material to purge said third heat storage zone, said second catalyst zone and said fourth heat storage zone, then, while continuing the flow of steam, injecting hydrocarbons to be catalytically reformed, at said elevated pressure of at least 50 p.s.i.g., substantially between said third heat storage zone and said second catalyst zone and simultaneously injecting normally liquid hydrocarbons to be thermally reformed, at said elevated pressure of at least 50 p.s.i.g., substantially between said second catalyst zone and said fourth heat storage zone, said third heat storage zone, said second catalyst zone and said fourth heat storage zone containing heat stored therein according to step (3) below, said hydrocarbons injected between said third heat storage zone and said second catalyst zone being reformed in said second catalyst zone with said steam into a gas rich in hydrogen which then passes to said fourth heat storage zone where it mixes with said normally liquid hydrocarbons injected between said second catalyst zone and said fourth heat storage zone, whereby said normally liquid hydrocarbons are thermally cracked in said fourth heat storage zone in the presence of said gas rich in hydrogen, and recovering the resulting product gas; and thereafter reversing said sequence by substantially simultaneously: (3) burning a fluid fuel with compressed air in a third combustion zone, passing the resulting hot products of combustion, at an elevated pressure of at least 50 p.s.i.g., successively through said third heat storage zone and said second catalyst zone to store heat in said third heat storage zone and said second catalyst zone, and substantially simultaneously burning fluid fuel, with compressed air in a fourth combustion zone downstream from said second catalyst zone and passing the resulting hot products of combustion along with the products of combustion from said second catalyst zone, at an elevated pressure of at least 50 p.s.i.g., through said fourth heat storage zone to store heat in said fourth heat storage zone, then discontinuing said burning while continuing the flow of compressed air to purge combustion products from said third heat storage zone, said second catalyst zone, and said fourth heat storage zone, expanding said products of combustion and purge gases, from said elevated pressure to substantially atmospheric pressure, in said expanding zone, compressing air in said compressing zone with energy derived from such expansion in said expanding zone, and passing said compressed air to said third combustion zone and said fourth combustion zone for said burning of fluid fuel and for said air purging, and (4) passing steam, at an elevated pressure of at least 50 p.s.i.g., successively through said first heat storage zone, said first catalyst zone, said second heat storage zone to purge said first heat storage zone, said first catalyst zone and said second heat storage zone, then, while continuing the flow of steam, injecting hydrocarbons to be catalytically reformed, at said elevated pressure of at least 50 p.s.i.g., into said steam substantially between said first heat storage zone and said first catalyst zone and simultaneously injecting normally liquid hydrocarbons, at said elevated pressure of at least 50 p.s.i.g., substantially between said first catalyst zone and said second heat storage zone, said first heat storage zone, said first catalyst zone and said second heat storage zone containing heat stored therein according to step (1) above, said hydrocarbons injected between said first heat storage zone and said first catalyst zone being reformed in said first catalyst zone with said steam into a gas rich in hydrogen which then passes to the second heat storage zone where it mixes with said normally liquid hydrocarbons injected between said first catalyst zone and said second heat storage zone whereby said normally liquid hydrocarbons are thermally cracked in said second heat storage zone in the presence of said gas rich in hydrogen, and recovering the resulting product gas, each of said combustion air-purging steps making up one-half of the cycle time and the flow of gases to be expanded to said expanding zone being continuous and substantially uniform in mass throughout the cycle.

References Cited

UNITED STATES PATENTS

| 2,662,004 | 12/1953 | Gaucher | 48—196 |
| 2,893,853 | 7/1959 | Milbourne | 23—288 XR |
| 2,944,806 | 7/1960 | Carter | 48—214 XR |
| 3,270,078 | 8/1966 | Bogart | 48—214 XR |

MORRIS O. WOLK, *Primary Examiner*

R. E. SERWIN, *Assistant Examiner.*

U.S. Cl. X.R.

48—197, 214